(12) United States Patent
Cadiz et al.

(10) Patent No.: US 12,517,176 B2
(45) Date of Patent: Jan. 6, 2026

(54) ELECTRICAL ARC TESTING DEVICE

(71) Applicant: The Boeing Company, Chicago, IL (US)

(72) Inventors: Dionel Cadiz, Everett, WA (US); Jason Damazo, Seattle, WA (US); Kevin Alexander Paroulek, Seattle, WA (US); Carl Roy McIver, Everett, WA (US); Dominic Martinez, Seattle, WA (US); James Paananen, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 377 days.

(21) Appl. No.: 18/081,827

(22) Filed: Dec. 15, 2022

(65) Prior Publication Data

US 2024/0201260 A1   Jun. 20, 2024

(51) Int. Cl.
| | |
|---|---|
| *G01R 31/327* | (2006.01) |
| *G01R 31/08* | (2020.01) |
| *G01R 31/12* | (2020.01) |
| *H02K 33/00* | (2006.01) |

(52) U.S. Cl.
CPC ......... *G01R 31/3277* (2013.01); *H02K 33/00* (2013.01)

(58) Field of Classification Search
CPC ....... G01R 31/08; G01R 31/12; G01R 31/327
See application file for complete search history.

(56) References Cited

U.S. PATENT DOCUMENTS

| | | | | |
|---|---|---|---|---|
| 6,359,249 | B1* | 3/2002 | Brown | B23K 11/3054 219/86.33 |
| 12,202,084 | B2* | 1/2025 | Folzenlogen | B23K 9/0671 |
| 2008/0100305 | A1* | 5/2008 | Gass | G01R 31/3272 324/536 |
| 2018/0297141 | A1* | 10/2018 | Uecker | B23K 9/1093 |
| 2019/0099769 | A1* | 4/2019 | Holverson | B33Y 10/00 |
| 2020/0122267 | A1* | 4/2020 | Gandara | B23K 9/28 |

\* cited by examiner

*Primary Examiner* — Neel D Shah
(74) *Attorney, Agent, or Firm* — COATS & BENNETT, PLLC

(57) ABSTRACT

A testing device to perform electrical arc testing on a workpiece. The testing device includes an electrode and an actuator mounted to the electrode. The actuator is configured to control a separation distance between the electrode and the workpiece. The actuator is further configured to oscillate the electrode and vary the separation distance to create a low voltage electrical arc when electrical energy is supplied to the electrode.

20 Claims, 6 Drawing Sheets

ELECTRICAL ARC TESTING DEVICE

TECHNOLOGICAL FIELD

The present disclosure relates generally to the field of electrical arc testing and, more specifically, to a testing device that provides a low voltage arc for electrical arc testing.

BACKGROUND

An electrical arc is a continuous electrical discharge across a gap formed between two electrodes. The electrical arc causes an arc flash where the electricity flows or discharges along a path. The arc flash is the heat and light produced during the electrical arc. Temperatures of an arc flash can reach excessive levels high enough to ignite materials in the area of the electrical arc.

Electrical arc testing is performed to determine the effects of an electrical arc and the resulting arc flash on materials. In one example, the testing determines the temperature of a material after being exposed to an electrical arc for a period of time. Another example determines if a material fails such as by igniting or melting when exposed to an electrical arc. Testing can also be performed to determine various other effects of the electrical arc on the material.

Existing testing equipment has a variety of issues that affect the ability to perform the testing and/or obtain meaningful results. Existing equipment positions an electrode relative to a test material. The equipment is difficult to adjust to control the gap that is formed between the electrode and the test material. Further, the equipment is difficult to control and thus it is difficult to replicate testing conditions during subsequent testing.

Existing testing equipment can also be relatively large in size. This sizing makes it difficult for use in certain environments. The testing equipment is either too large to fit into an environment, or requires that the environment be modified to accommodate the testing equipment.

SUMMARY

One aspect is directed to a testing device to perform electrical arc testing on a workpiece. The testing device comprises an electrode and an actuator mounted to the electrode. The actuator is configured to control a separation distance between the electrode and the workpiece. The actuator is configured to oscillate the electrode and vary the separation distance to create a low voltage electrical arc when electrical energy is supplied to the electrode.

In another aspect, the actuator is configured to vary the separation distance during the testing within a range of between 1 µm and 5 mm.

In another aspect, a power source supplies the electrical energy to the electrode with the power source configured to provide current in a range of between 10-1000 A at a voltage in a range of between 5-1000V.

In another aspect, the actuator is configured to oscillate the electrode at a frequency in a range of between 1-2000 Hz.

In another aspect, the actuator comprises a pivot arm connected to the electrode, and a linkage connected to the pivot arm with the linkage spaced away from the electrode and with the linkage configured to pivot the pivot arm to oscillate the electrode.

In another aspect, a motor is connected to the linkage to drive the linkage and thereby pivot the pivot arm.

In another aspect, the linkage and the pivot arm form a four bar linkage.

In another aspect, a base supports the actuator, the electrode, and the workpiece.

In another aspect, the electrode is constructed from a material with a high melting temperature selected from the group consisting of tungsten and carbon steel.

In another aspect, the electrode is constructed from a material with a low melting temperature selected from the group consisting of copper, zinc, and aluminum.

In another aspect, sensors are configured to detect characteristics of the electrical arc on the workpiece and a control unit receives signals from the sensors and determines one or more effects on the workpiece due to the electrical arc testing.

One aspect is directed to a testing device to perform electrical arc testing on a workpiece. The testing device comprises an electrode. A power source supplies electrical power to the electrode. An actuator positions the electrode relative to the workpiece with the actuator configured to move the electrode through a motion range that varies a separation distance between the electrode and the workpiece. The power source is configured to sustain the electrical power to the electrode to maintain an electrical arc between the electrode and the workpiece during the motion range.

In another aspect, the actuator comprises: a linkage operatively connected to the electrode; a motor that drives the linkage; and wherein the actuator is configured to vary the separation distance within a range of between 1 µm and 5 mm.

In another aspect, a control unit comprises processing circuitry configured to control the motor and the position of the electrode relative to the workpiece.

In another aspect, the electrical energy supplied by the power source is low voltage power with current in a range of between 10-1000 A and a voltage in a range of between 5-1000V.

In another aspect, the actuator comprises a four bar linkage comprising four links that are pivotally connected together and configured to move the electrode through the motion range.

In another aspect, the four bar linkage comprises a pivot arm mounted to the electrode, and a linkage comprising a first link and a second link that are pivotally connected together.

One aspect is directed to a method of performing electrical arc testing on a workpiece. The method comprises: attaching an electrode to an actuator; providing electrical power to the electrode and moving the electrode through a motion range; modulating a separation distance formed between the electrode and the workpiece; and sustaining a low voltage arc between the electrode and the workpiece while moving the electrode through the motion range.

In another aspect, the method further comprises controlling the separation distance between the electrode and the workpiece during the motion range and preventing the separation distance from exceeding a predetermined amount.

In another aspect, the method further comprises electrically insulating the electrode from the actuator.

The features, functions and advantages that have been discussed can be achieved independently in various aspects or may be combined in yet other aspects, further details of which can be seen with reference to the following description and the drawings.

DETAILED DESCRIPTION

Figure 1:
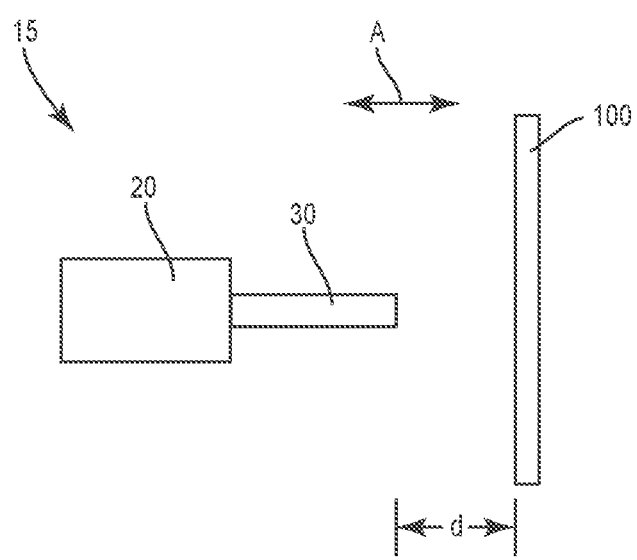
FIG. 1 is a schematic diagram of a testing device for performing electrical arc testing on a workpiece.

FIG. 1 illustrates a testing device 15 configured to perform electrical arc testing on a workpiece 100. The testing device 15 includes an actuator 20 that mounts to an electrode 30. The actuator 20 is configured to position the electrode 30 with a separation distance d between the electrode 30 and the workpiece 100. The actuator 20 oscillates the electrode 30 towards and away from the workpiece 100 as illustrated by arrow A. During the testing, electrical energy is supplied to the electrode 30 to create the electrical arc with the workpiece 100. The testing device 15 is configured to sustain a low voltage electrical arc between the electrode 30 and the workpiece 100.

The actuator 20 positions the electrode 30 at a separation distance d that is conducive to low voltage electric breakdown. The oscillation of the actuator 20 moves the electrode 30 through a motion range that has varying separation distances d. In one example, the separation distance d ranges during the oscillation is between 1 µm and 5 mm. Other examples of ranges of separation distances d during oscillation include but are not limited to: 0 and 1 µm; 1 µm and 2 µm; 2 µm and 10 µm; 10 µm and 50 µm; 50 µm and 500 µm; 500 µm and 2 µmm; and 2 µmm and 5 µmm.

The actuator 20 oscillates the electrode 30 in a motion range towards and away from the workpiece 100 indicated by arrow A. In one example, the actuator 20 moves the electrode 30 directly towards and away from the workpiece 100 (i.e., the electrode 30 30 moves perpendicular to a surface of the workpiece 100). In another example, the actuator 20 moves the electrode 30 at a non-perpendicular angle relative to the surface of the workpiece 100.

The actuator 20 is adjustable to control the frequency of the oscillations. In one example, the frequency is within a range of between 1-2000 Hz.

Figure 2:
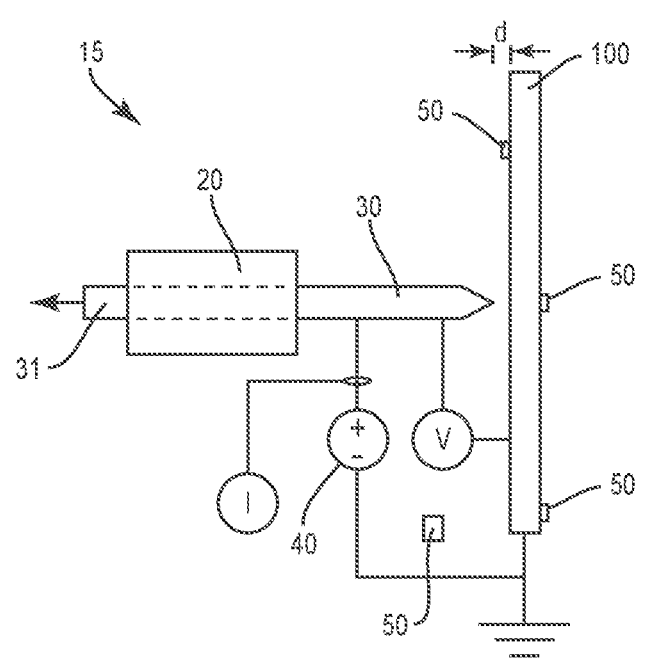
FIG. 2 is a schematic diagram of a testing device for performing electrical arc testing on a workpiece.

FIG. 2 illustrates a testing device 15 for performing electrical arc testing on a workpiece 100. The electrode 30 is mounted to the actuator 20. Insulation 31 is positioned on the electrode 30 to electrically isolate the electrode 30 from the actuator 20. The actuator 20 is configured to control the position of the electrode 30 relative to the workpiece 100 and control the separation distance d.

A power source 40 provides electrical energy to the electrode 30 during the testing. The power source 40 provides electrical energy for a sustained low voltage arc during the testing. The aspects of the power can vary. In one example, the power source 40 provides current in the range of 10-1000 A, at a voltage of 5-1000 V, and for a duration of 0-300 seconds.

In one example as illustrated in FIG. 2, the power source 40 provides electrical energy to both the electrode 30 and the workpiece 100. In another example, the power source 40 provides electrical energy to just the electrode 30, and a separate power source supplies power to the workpiece 100.

One or more sensors 50 are position to detect one or more effects of the electrical arc testing on the workpiece 100. In one example, one or more sensors 50 detect the temperature of the workpiece 100 after being exposed to the electrical arc for a period of time. Another example includes one or more sensors 50 configured to determine whether the workpiece 100 fails such as by igniting or melting when exposed to the electrical arc. The sensors 50 can include a variety of different configurations. In one example, a sensor 50 is a thermocouple that provides for measuring the temperature of the workpiece 100. Another example includes a sensor 50 that includes one or more cameras for capturing digital images of the workpiece 100. The sensor 50 further includes processing capability to analyze the digital images to determine the effect on the workpiece 100.

Figure 3:
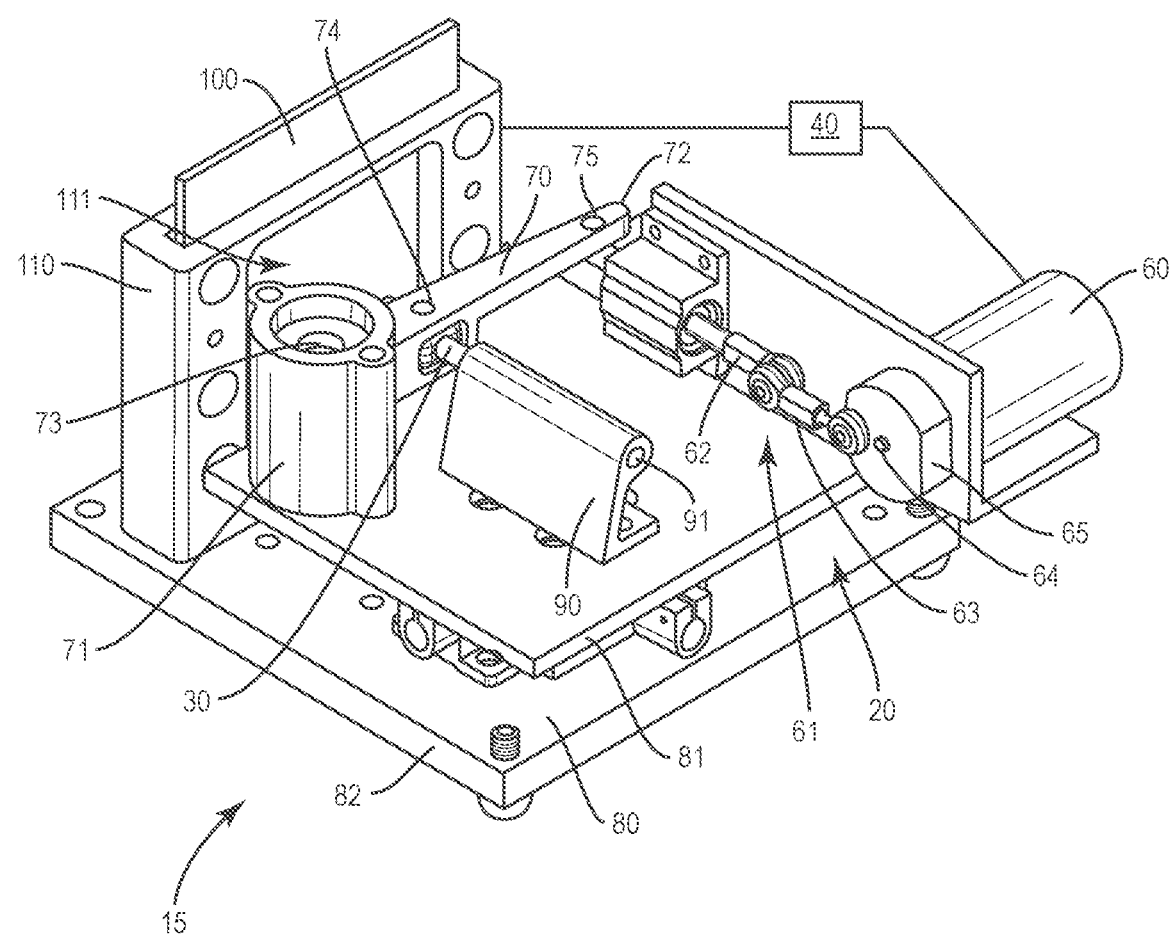
FIG. 3 is a perspective view of a testing device for performing electrical arc testing on a workpiece.
Figure 4:
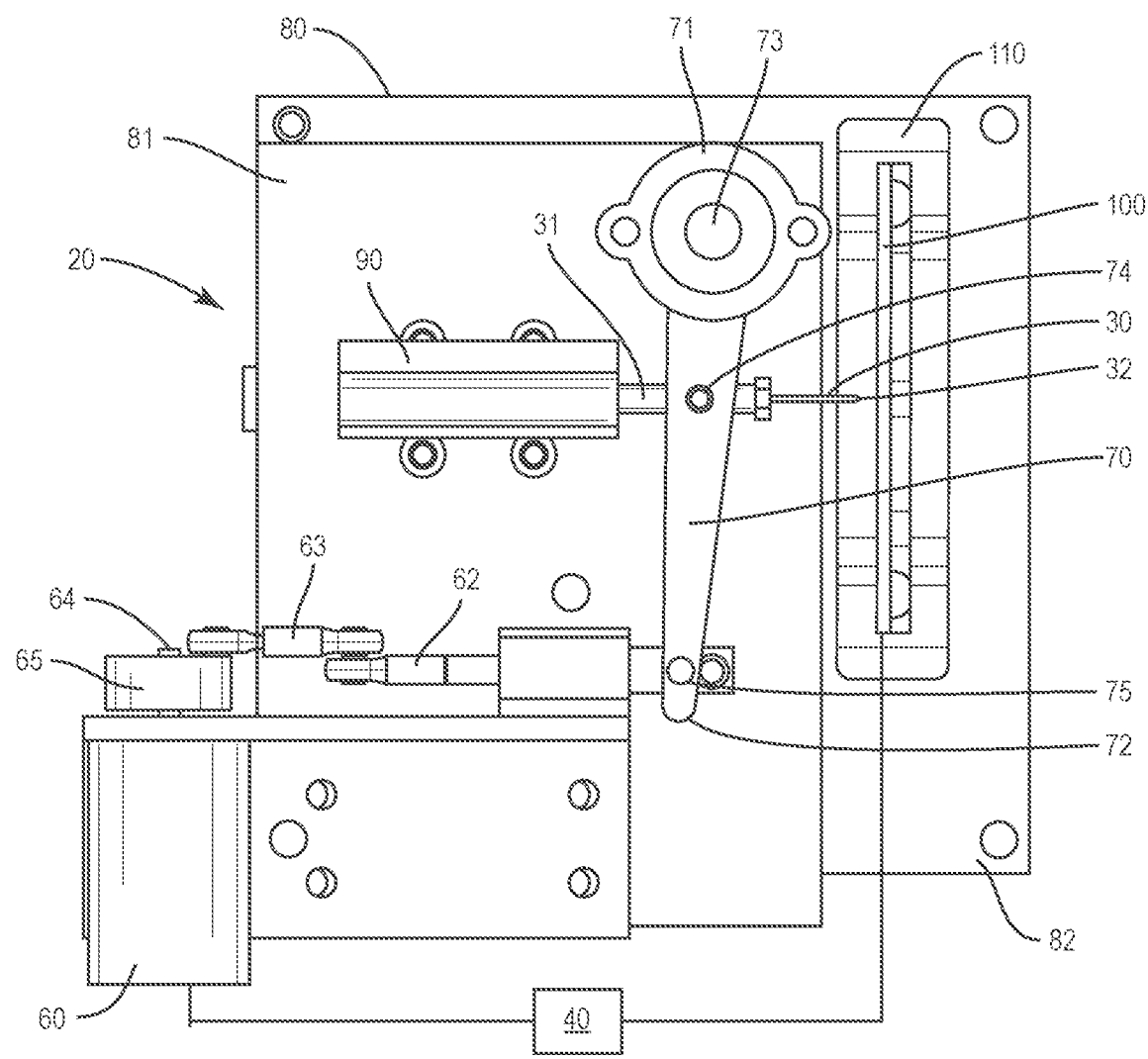
FIG. 4 is a top view of the testing device of FIG. 3.

FIGS. 3 and 4 illustrate a testing device 15 for performing electrical arc testing on a workpiece 100. The testing device 15 includes an actuator 20 and an electrode 30. Electrical energy from a power source 40 is supplied to produce an electrical arc between the tip 32 of the electrode 30 and the workpiece 100.

The electrode 30 is an electrical conductor that includes a tip 32 from which the electrical arc is formed. The electrode 30 can be constructed from a variety of different materials. In one example, the electrode is constructed from a material with a high melting temperature, such as tungsten and carbon steel. In another example, the electrode 30 is constructed from a material with a low melting temperature such as copper, zinc, and aluminum.

The electrode 30 can include various shapes and sizes. In one example, the electrode 30 has an elongated shape with the tapered tip 32 formed at one end. The electrode 30 includes an electric insulator 31. The insulator 31 can prevent current flow from the electrode 30 and provide for attachment with the actuator 20. In one example as illustrated in FIG. 4, the insulation 31 includes a sleeve that receives a section of the electrode 30. A second section of the electrode 30 including the tip 32 extends outward and is exposed for forming the electric arc.

A holder 90 supports the electrode 30. The holder 90 is configured for the electrode 30 to move in the oscillating directions (arrow A in FIG. 1) and prevent movement of the electrode 30 in other directions. The holder 90 includes an enclosed receptacle 91 sized to receive the electrode 30. The receptacle 91 is open at least on the side that faces towards the workpiece 100 to provide for the electrode 30 to extend outward and to oscillate. In one example, the receptacle 91 includes a sectional shape that matches the electrode 30. In one example, the receptacle 91 includes a centerline that is aligned perpendicular to the workpiece 100 during the testing.

The actuator 20 is configured to position the electrode 30 relative to the workpiece 100. The actuator 20 is further configured to oscillate the electrode 30 within a motion range that extends towards and away from the workpiece 100. The motion of the electrode 30 within the motion range causes the separation distance d to vary during each oscillation cycle. The various control settings for the movement of the actuator 20 to control the separation distance d, motion range, and frequency of oscillations can be adjusted and controlled to control the arcing characteristics.

FIGS. 3 and 4 illustrate one example of an actuator 20 for controlling the positioning of the electrode 30. The actuator 20 includes a pivot arm 70, a motor 60, and a linkage 61. The pivot arm 70 includes an elongated shape with a first end 71 and an opposing second end 72. The pivot arm 70 pivots about pivot point 73 which is at the first end 71. The pivot arm 70 is operatively connected to the electrode 30 at a connector 74.

The linkage 61 is connected to the pivot arm 70. The linkage 61 includes a first link 62 and a second link 63 that are pivotally connected together. The second link 63 is connected to the pivot arm 70 at a connector 75. The linkage 61 is operatively connected to the motor 60. This connection is through the first link 62 being connected to a mount 65 that is attached to a shaft 64 of the motor 60. The motor 60 is configured to rotate the shaft 64 which in turn rotates the mount 65 and drives the linkage 61. The linkage 61 is connected to the mount 65 away from the center thus providing for oscillating the linkage 61 as the mount 65 is rotated by the motor 60. In one example, the motor 60 is powered by the power source 40.

In one example, the actuator 20 includes a four bar linkage configured to control the motion of the electrode 30 along the motion range towards and away from the workpiece 100.

Power source 40 provides electrical power to one or more of the electrode 30, workpiece 100 and the motor 40. In one example, the power source 40 is localized to the testing device 15 and includes one or more batteries. In another example, the power source 40 includes external AC power, such as a household or industrial power source available through the power grid.

A base 80 provides for mounting the components of the testing device 15. The base 80 can include one or more sections to mount the components. FIGS. 3 and 4 include a base 80 with a first plate 81 and a second plate 82. The plates 81, 82 are connected together with one or more fasteners.

The workpiece 100 is mounted in proximity to the electrode 30. In one example, a mount 110 is connected to the base 80 to position the workpiece 100. The mount 110 includes a frame with a window 111 through which the workpiece 100 is exposed to the electrode 30. The mount 110 provides for securing and preventing movement of the workpiece 100 during the arc testing.

One or more sensors 50 are positioned to test conditions during the testing. The sensors 50 test aspects of one or more of the workpiece 100, the electrode 30, and the environment at the electrical arc. Various types of sensors 50 are used for the electrical arc testing. One example includes a sensor 50 that detects a temperature. One specific example is a thermocouple. Another example includes a sensor 50 that detects the electrical energy deposited into the workpiece 100, such as the electric current and/or voltage. Another example is a sensor 50 that detects the effects of the energy on the workpiece 100 such as an amount of material eroded during the testing. In one example, one or more of the sensors 50 include cameras to measure the pre- and post-test mass measurements.

A control unit 120 controls the overall operation of the testing device 15. The control unit 120 controls one or more of the position of the electrode 30 relative to the workpiece 100, the stroke length of the electrode 30 during the testing, and the frequency of the oscillation. The control unit 120 can be located in proximity to the actuator 20 and electrode 30 such as being mounted to the base 80, or can be remotely located and communicate wirelessly and/or through hard-wire connections with the components.

Figure 5:
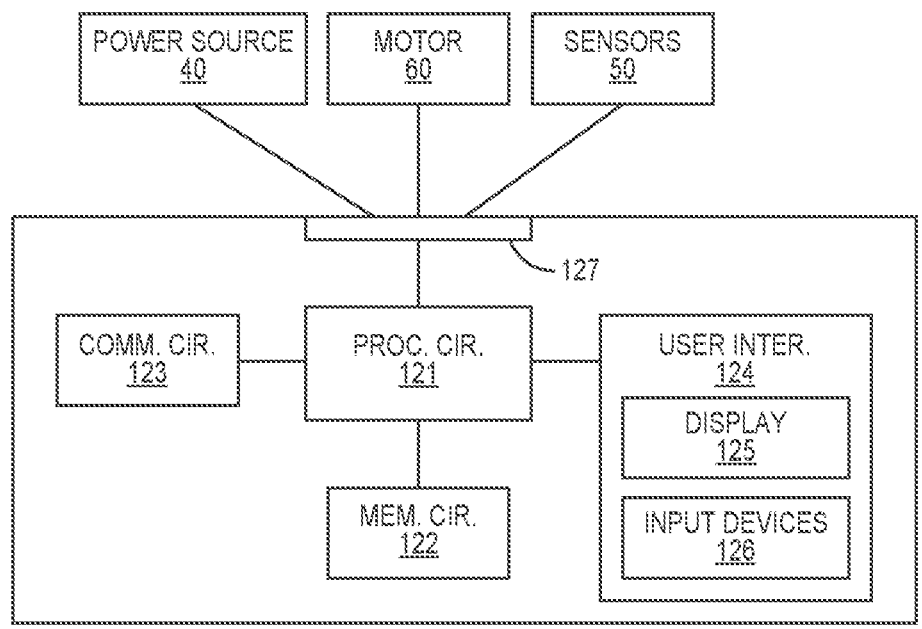
FIG. 5 is a schematic diagram of a control unit of a testing device.

FIG. 5 illustrates a control unit 120 configured to control the arc testing. The control unit 120 includes a control circuit 121 and a memory circuit 122. The control circuit 121 controls the various aspects of testing according to program instructions stored in the memory circuit 122. Within examples, the control circuit 121 includes one or more circuits, microcontrollers, microprocessors, hardware, or a combination thereof. Memory circuit 122 includes a non-transitory computer readable storage medium storing program instructions, such as a computer program product, that configures the control circuit 121 to implement one or more of the techniques discussed herein. Memory circuit 122 can include various memory devices such as, for example, read-only memory, and flash memory. In one example, memory circuit 122 is a separate component as illustrated in FIG. 5. In another example, memory circuit 122 is incorporated with the control circuit 121.

Communication circuitry 123 provides for communicating with remote components and devices. The communication circuitry 123 is configured to provide for one or more of wireless communications and communications through hardwire connections.

A user interface 124 provides for a user to control one or more aspects of the testing. This can include one or more displays 125 for displaying information to the user. The user interface 124 can also include one or more input devices 126 such as but not limited to a keypad, touch screen, touchpad, roller ball, and joystick. The one or more input devices 126 provide for the user to enter commands to the control circuit 121. In different examples, the one or more displays 125 and input devices 126 are positioned on the base 80. An interface 127 is configured to transmit and/or receive signals with one or more of the power source 40, sensors 50, and motor 60.

In one example, the control unit 120 receives signals indicative of the aspects detected from the one or more sensors 50. The control unit 120 performs calculations to determine the results of the arc testing. The control unit 120 can also be configured to output results to the display 125 and/or a remote device. In another example, the control unit 120 outputs the data to a remote computing device that analyzes the data.

Figure 6:
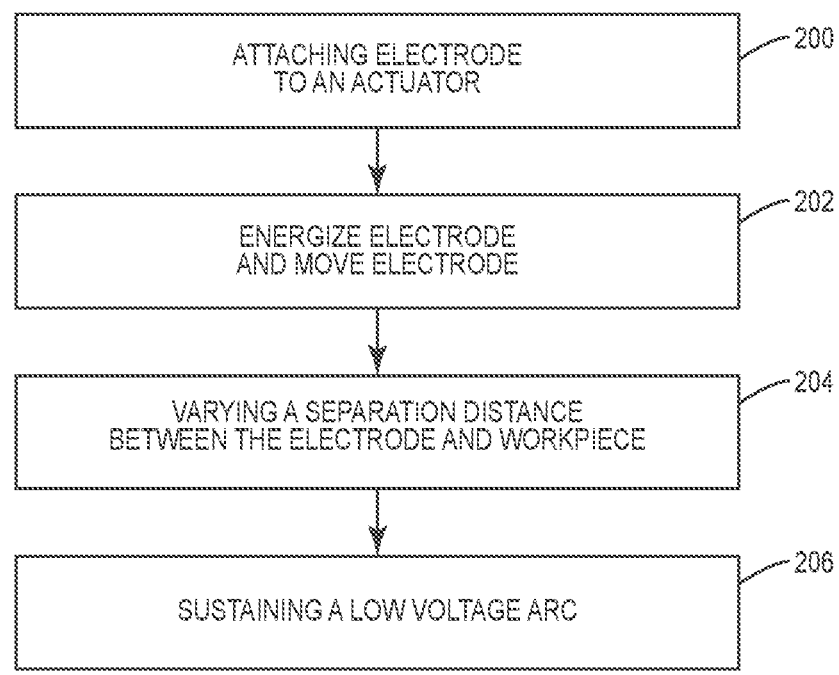
FIG. 6 is a flowchart diagram of a method of performing electrical arc testing on a workpiece.

FIG. 6 illustrates a method of performing electrical arc testing on a workpiece 100. The method includes attaching an electrode 30 to an actuator 20 (block 200). The electrode 30 is positioned with the tip 32 exposed and positioned towards the workpiece 100. Further, the actuator 20 is configured to position the tip 32 at an initial position relative to the workpiece 100.

Electrical power is provided to the electrode 30 and the actuator 20 is activated to move the electrode 30 through the motion range (block 202). The movement of the electrode 30 within the motion range modulates a separation distance d formed between the electrode 30 and the workpiece 100 (block 204). A low voltage arc is sustained between the electrode 30 and the workpiece 100 while the electrode 30 moves through the motion range (block 206).

The actuator 20 is configured to set the motion range. This includes a first end point of the range with the electrode 30 positioned the closest to the workpiece 100, and a second end point of the range with the electrode 30 positioned farthest from the workpiece 100. The motion range extends between these two end points. The electrical energy supplied during the testing provides for the electrical arc between the electrode 30 and the workpiece 100 to be maintained during the motion range. Further, the frequency of the actuator can be adjusted.

In one example as disclosed above in FIGS. 3 and 4, the actuator 20 includes the linkage 61 and pivot arm 70 that are configured to oscillate the electrode 30. In another example, the actuator 20 includes gears that engage together to drive the electrode 30 through the motion range. In another example, the actuator includes magnets that create a magnetic field to drive the electrode 30 through the motion range.

In one example, the actuator 20 oscillates the electrode 30 during the arc testing. In another example, the actuator 20 maintains the electrode 30 a fixed distance from the workpiece 100 during the arc testing.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A testing device to perform electrical arc testing on a workpiece, the testing device comprising:
   an electrode;
   an actuator mounted to the electrode, the actuator configured to control a separation distance d between the electrode and the workpiece, the actuator comprising:
      a pivot arm comprising an elongated shape, the pivot arm operatively connected to the electrode at a first location;
      a linkage connected to the pivot arm at a second location that is away from the first location;
      a motor configured to move the linkage and the pivot arm in an oscillating motion to move the electrode through a motion range that varies the separation distance d;
   wherein the actuator is configured to oscillate the electrode and vary the separation distance d to create a low voltage electrical arc when electrical energy is supplied to the electrode.

2. The testing device of claim 1, wherein the actuator is configured to vary the separation distance d within a range of between 1 μm and 5 mm.

3. The testing device of claim 1, further comprising a power source to supply the electrical energy to the electrode, the power source configured to provide current in a range of between 10-1000 A at a voltage in a range of between 5-1000V.

4. The testing device of claim 1, wherein the actuator is configured to oscillate the electrode at a frequency in a range of between 1-2000 Hz.

5. The testing device of claim 1, wherein the pivot arm comprises a first end and a second end, the first end comprising a pivot and the linkage connected at the second end.

6. The testing device of claim 5, wherein the linkage and the pivot arm form a four bar linkage.

7. The testing device of claim 1, wherein the motor is configured to rotate a shaft which in turn rotates a mount that drives the linkage.

8. The testing device of claim 1, further comprising a base that supports the actuator, the electrode, and the workpiece.

9. The testing device of claim 1, wherein the electrode is constructed from a material with a high melting temperature selected from the group consisting of tungsten and carbon steel.

10. The testing device of claim 1, wherein the electrode is constructed from a material with a low melting temperature selected from the group consisting of copper, zinc, and aluminum.

11. The testing device of claim 1, further comprising:
    sensors configured to detect one or more aspects the workpiece during the electrical arc testing; and
    a control unit that receives signals from the sensors and determines one or more effects on the workpiece due to the electrical arc testing.

12. A testing device to perform electrical arc testing on a workpiece, the testing device comprising:
    an electrode;
    a power source that supplies electrical power to the electrode;
    a holder that holds the electrode;
    a drive member that is spaced away from the holder;
    an arm with an elongated shape that extends between the holder and the drive member with the arm connected to the holder at a first location and the drive member connected to the arm at a second location that is spaced away from the first location;
    the drive member configured to move the arm and the holder and electrode through a motion range that varies a separation distance between the electrode and the workpiece; and
    the power source configured to provide the electrical power to the electrode to create an electrical arc between the electrode and the workpiece during the motion range.

13. The testing device of claim 12, wherein the drive member comprises:
    a linkage operatively connected to the arm;
    a motor that drives the linkage; and
    wherein the drive member is configured to vary the separation distance d within a range of between 1 μm and 5 mm.

14. The testing device of claim 13, further comprising a control unit comprising processing circuitry configured to control the motor and a position of the electrode relative to the workpiece.

15. The testing device of claim 13, wherein the arm and the drive member comprise a four bar linkage comprising four links that are pivotally connected together and configured to move the electrode through the motion range.

16. The testing device of claim 15, wherein the four bar linkage comprises:
    the pivot arm; and
    the drive member that comprises a first link and a second link that are pivotally connected together.

17. The testing device of claim 12, wherein the electrical energy supplied by the power source is low voltage power with current in a range of between 10-1000 A and a voltage in a range of between 5-1000V.

18. A method of performing electrical arc testing on a workpiece, the method comprising:
    attaching an electrode to holder with the holder connected to an arm with an elongated shape;
    providing electrical power to the electrode;
    operating a motor and driving a drive member that is connected to the arm at a location away from the holder and moving the electrode through a motion range;
    modulating a separation distance d formed between the electrode and the workpiece; and
    creating a low voltage arc between the electrode and the workpiece while moving the electrode through the motion range.

19. The method of claim 18, further comprising controlling the separation distance d between the electrode and the workpiece during the motion range and preventing the separation distance d from exceeding a predetermined amount.

20. The method of claim 18, further comprising electrically insulating the electrode from the arm.

\* \* \* \* \*